United States Patent
Cacace

(10) Patent No.: US 6,706,416 B1
(45) Date of Patent: Mar. 16, 2004

(54) PROCESS FOR MANUFACTURING CORROSION RESISTANT COMPOSITE METAL PRODUCTS

(76) Inventor: Antonino Giorgio Cacace, Crud Y Gwynt, Caswell, Swansea, West Glamorgan (GB), SA3 3BU ( * ) Notice: Subject to any disclaimer, the term of this patent is extended or adjusted under 35 U.S.C. 154(b) by 0 days.

(21) Appl. No.: 10/048,121
(22) PCT Filed: Jul. 27, 2000
(86) PCT No.: PCT/GB00/02894
§ 371 (c)(1),
(2), (4) Date: Jul. 2, 2002
(87) PCT Pub. No.: WO01/07671
PCT Pub. Date: Feb. 1, 2001

(30) Foreign Application Priority Data

Jul. 28, 1999 (NZ) .................................................. 336942

(51) Int. Cl.⁷ .............................. B22F 8/10; B22F 3/18; B32B 15/02; B32B 15/18
(52) U.S. Cl. ........................ 428/548; 428/557; 428/683; 428/685; 148/514; 148/529; 148/612; 148/621
(58) Field of Search ................................ 428/548, 557, 428/683, 685; 148/514, 529, 612, 621

(56) References Cited

U.S. PATENT DOCUMENTS

| | | | | |
|---|---|---|---|---|
| 3,625,277 A | * | 12/1971 | Watts | 164/461 |
| 3,680,624 A | * | 8/1972 | Watts | 164/461 |
| 4,162,758 A | * | 7/1979 | Mikarai | 228/131 |
| 4,831,708 A | * | 5/1989 | Yoshiwara et al. | 29/423 |
| 5,051,315 A | * | 9/1991 | Cacace | 428/549 |
| 5,088,399 A | * | 2/1992 | Cacace et al. | 100/218 |
| 5,124,214 A | | 6/1992 | Cacace | |
| 5,676,775 A | | 10/1997 | Cacace et al. | |

OTHER PUBLICATIONS

Database WPI, Section CH, Week 199834, Derwent Publications Ltd., London, GB; Class M22, AN 1998–390608, XP 002151085 & JP 06 320253 (Nippon Steel Corp), Nov. 22, 1994, abstract.

Database, WPI, Section Ch, Week 198621, Derwent Publications, Ltd., London, GB; Class M14, AN 1986–133974, XP002151086 & JP 61 069981 (Toshiba KK), Apr. 10, 1986, abstract.

* cited by examiner

Primary Examiner—John J. Zimmerman
Assistant Examiner—Jason Savage
(74) Attorney, Agent, or Firm—Young & Thompson

(57) ABSTRACT

A method of producing a corrosion resistant ferrous product is disclosed. The product is produced by rolling a heated billet which comprises a mass of mild steel swarf in a stainless steel jacket. Two reducing agents are present in the jacket when the billet is heated. The first reducing agent is in the form of powdered aluminum, titanium turnings or other metal having a greater affinity for oxygen than chrome and which promotes the formation of CO rather than $CO_2$ from air or oxygen which enters or evolves in the billet above about 800° C. The second reducing agent is in gaseous or vapour form substantially below that temperature. The second reducing agent may be provided by pre-mixing with the swarf such substances as ammonium chloride or urea, which dissociate to form reducing gases when heated. Alternatively, the billet can be heated in a reducing furnace and the gas in the furnace may act as the second reducing agent.

17 Claims, 3 Drawing Sheets

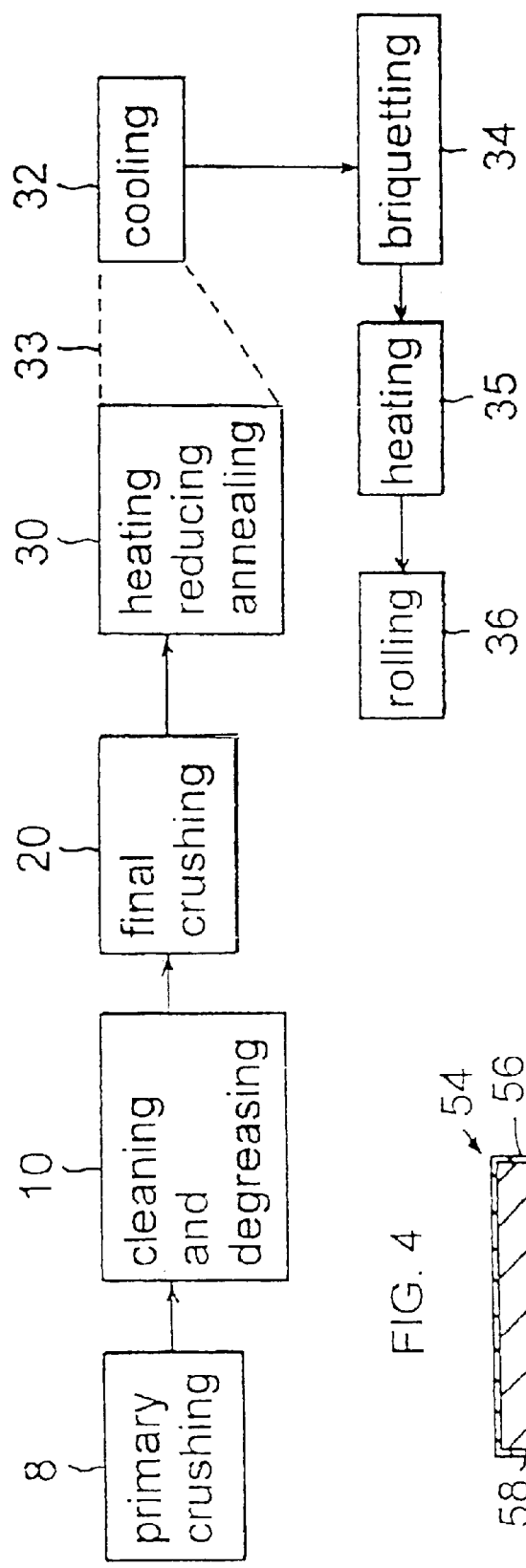
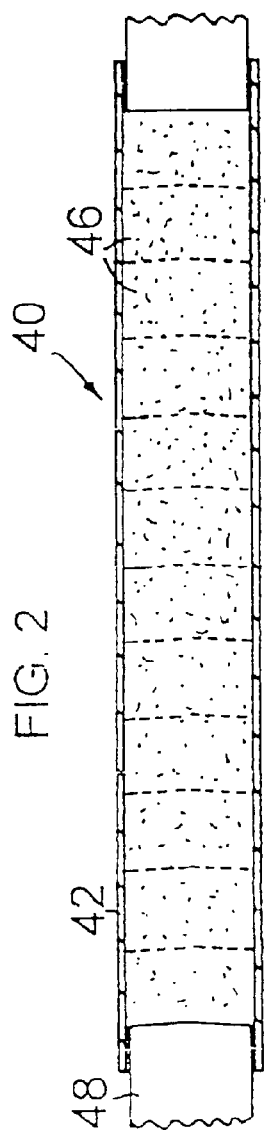
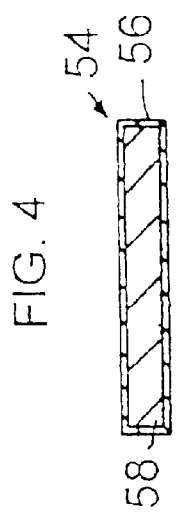
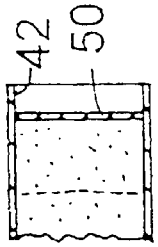

PROCESS FOR MANUFACTURING CORROSION RESISTANT COMPOSITE METAL PRODUCTS

FIELD OF THE INVENTION

This invention relates to a process for the manufacture of corrosion resistant metal products and to products produced from the process. The invention has particular but not necessarily exclusive application to products comprising a core formed from recycled mild, carbon or stainless steel swarf and having a stainless steel cladding. For example, the invention may also be applicable to a product comprising a core formed from powdered iron ore and even from other metals and metalliferous ores in which the problems identified herein are encountered.

In this specification 'swarf' comprehends the off cuts from machining operations in general and is intended to include the off cuts from turning, boring, shaping and milling operations on engineering steels. The off cuts from a variety of other operations including some stamping and punching operations may also be suitable. For the purposes of this specification, the term includes not only such off cuts composed of raw swarf but also such off cuts from swarf which has been cleaned and/or otherwise treated, for example by the methods described herein, to make them more suitable for forming a billet from which the clad products are made.

The term "engineering steel" is intended to describe those low alloy steels which are commonly subjected to machining operations including mild steel (a term which itself includes carbon steel), forging steel and axle or shaft steel all of which contain significant amounts of carbon.

BACKGROUND OF THE INVENTION

The background of the present invention is set out in detail in the specification of international patent application #PCT/GB94/00091. In that specification reference is made to the specifications of several other patent applications which are discussed further below. One of the products of the process described in the aforementioned application PCT/GB94/00091 which is potentially of commercial and technical importance is a billet comprised of a stainless steel jacket filled with briquettes of mild steel swarf which can be heated and worked into a finished product having the desirable properties and low cost of mild steel but which has a stainless steel cladding for substantially increased corrosion resistance. Attempts to produce such products have not been as successful as was originally expected and it is an object of the present invention to address at least one of the problems which has contributed to this lack of success.

In the numerous experiments which have been conducted in attempts to produce such products, they have persistently exhibited a green chrome oxide layer occurring on the inner face of the stainless steel cladding and at the interface between the cladding and the core. This green layer has occurred despite the fact that metallographic examination of the core after the billet has been heated and rolled indicates substantially complete reduction of all surface oxides in the swarf and substantially complete fusion between the particles of swarf. Bonding between the cladding and the core cannot be relied on where this green layer occurs.

It is thought that chrome oxides on the stainless steel pipe form a barrier between the core of compressed swarf and the stainless steel. This barrier forms during heating and subsequent hot rolling and impedes bonding between the core and the cladding in the final product, To overcome this problem efforts have been directed at reducing or preventing the formation of chrome oxides on the stainless steel pipe. One technique which has been used is aimed at limiting the original oxide/oxygen content within the pipe, before heating commences. Application PCT/GB94/00091 discloses a technique aimed at eliminating surface oxides in the swarf by passing the swarf through a direct-reduction type kiln similar to the kilns used in the production of direct-reduced sponge iron in the production of steel. The equipment and plant required for this process are costly.

In another technique described in application PCT/GB94/00091, the Boudouard equation is suppressed by taking steps aimed at ensuring that reducing gases are present in the billet throughout heating. These steps include the addition of additives to the swarf which generate reducing gases in the billet when it is heated. The additives should not leave behind significant quantities of solid deposits which would later appear as inclusions which would affect the quality of the final product. The additives proposed include urea and ammonium chloride.

To date, the two aforementioned techniques have generally been used together. However, despite the use of these techniques, some degree of oxidation has continued to occur. Although the final product is often generally acceptable for some purposes, the level of rejects due to the unpredictable degree of bonding between the core and the jacket during rolling remains unacceptably high from a commercial point of view. The rejects exhibit excessive spreading of the cladding during the hot rolling process. This severely hinders efficient rolling of the product by limiting the reduction per rolling pass to only light draughts. This limitation causes excessive cooling of the product which in turn reduces bond strength and limits the number of sizes and shapes which can be rolled. Unpredictable bonding between the core and the stainless steel may also be manifested by elongation of the core which, in some cases, can protrude from the centre of the billet. When this happens, further rolling is prevented and the billet must be scrapped. This problem has been addressed by welding short lengths of mild steel pipe (about 100 mm long) to each end of the stainless steel pipe (which generally has been about 200 cm long). The mild steel ends arc crimped closed prior to loading the billet in the furnace. These mild steel ends are thought to act in two ways.

The coefficient of expansion of stainless steel is greater than that of mild steel which causes the pipe to separate from the core due to differential expansion. There is no significant such separation between the mild steel end portions and the core. The mild steel ends thus form with the core a type of "plug" at each end of the billet. The compressed mild steel core, furthermore welds very easily to the mild steel pipe ends during initial rolling, thus preventing the escape of the core from the billet during rolling. The use of these mild steel ends is described in detail in international patent application #PCT/GB90/101437. It is not known how effective these plugs are in preventing the ingress of oxidising gases further into the billet as the core is initially still porous. Perhaps only the end portions of the stainless steel pipe are oxidised due to atmospheric oxygen which penetrates the end portions of the billet.

Another advantage of using the mild steel pipe ends is that they facilitate entry of the billet into the rolls, particularly in the first pass.

It is time consuming to cut and weld the mild steel pipe ends to the stainless steel pipes. Furthermore, good quality welds are required to prevent the welds from breaking during hot rolling which would in turn cause oxidation and, at times, scrapping of the billet.

In summary the disadvantages of the techniques described above include:

a costly reduction kiln required to pre-reduce the swarf;

a commercially unacceptable level of rejects due to unpredictable bonding during rolling;

limitations in the sizes and shapes that can be rolled with the billets;

the added cost of welding the mild steel ends onto the stainless steel pipes.

The unpredictability of the described oxidation prevention techniques is thought to be due to the sequence of events which occurs during heating up of the billet.

In the initial phase of heating both $NH_4Cl$ and urea generate considerable volumes of reducing gases in the temperature range from 200° C. up to about 500° C. These gases are expelled from the billets as flames which are visible in the furnace in this temperature range. These flames usually cease abruptly when all of the $NH_4Cl$ or urea has evolved into gas and the reaction has gone to completion. Both $NH_4Cl$ and urea are spent at well below 600° C. Once spent, neither of these substances generates positive pressure inside the billet.

Above 500 and even 600° C. there are still reducing gases present from the reaction inside the billet but these are thought to gradually diffuse out of the billet. Furthermore, the volume of such residual reducing gases can be reduced rapidly by a reduction in temperature which brings about a sudden contraction in the volume of gases in the billet. This volume reduction has the effect of sucking in gases which are present in the furnace atmosphere and which are usually if not always oxidising.

The remaining residual reducing gases may be insufficient to neutralise any oxidising gases inside the billet. In the 800–1250° C. temperature range the reducing gas is thought to be mostly CO. The billet is especially susceptible to sudden cooling when it is taken out of the furnace in the 10–15 seconds before entering the rolling mill. At this time, significant oxidation can occur from the ends of the billet especially if they are open to the atmosphere.

Three temperature phases have thus been identified and examined during the heating of the billets. The first temperature phase lies in the range from ambient to just over 500° C. When $NH_4Cl$ or urea is the additive, a reducing gas is generated which scours and purges residual oxygen and some oxides from the system with the object of suppressing the Boudouard equation. This would otherwise create an equilibrium of oxidising gases up to 800° C. $NH_4Cl$ has been found to be the most effective reducing agent in the first temperature phase even though it reacts for a relatively short part of the total heating cycle, as it disassociates initially into ammonia and hydrochloric acid at below 300° C. Hydrochloric acid is a reducing/scouring agent and ammonia disassociates into hydrogen and chlorine at about 500° C. Above this temperature the ammonia is completely spent. Several experiments, in which billets were heated only to this temperature, have revealed that the inside walls of the stainless steel pipe were still metallic and not oxidised. Some reduction of the mild steel core had occurred.

The second temperature phase lies in the range 500–800° C. It is thought that some of the reducing gases from the first temperature phase are still present during this second phase. It is however believed that the billet is most vulnerable to oxidation in the second phase because conditions inside the billet favour the formation of $CO_2$ (rather than CO) from any iron oxides in the swarf or from any oxidising furnace gases which enter the billet. Carbon occurs in the billet as a result of the decarburisation of the steel of which the core is composed. Even an excess of carbon present in the system will result in an atmosphere which is predominantly $CO_2$. According to the Boudouard equation, such an atmosphere is oxidising to the stainless steel. Mild oxidation of the steel core is not the problem, as such oxidation would be reduced in the following temperature phase.

However, chrome oxide formed in the second temperature phase would not be reduced in the third temperature phase when the temperature ranges from 800–1250° C. In this latter phase, in equilibrium according to the Boudouard equation, conditions favour the formation of CO. An atmosphere composed predominantly of CO is highly reducing to carbon steel but at best is thought to be non-oxidising (i.e. neutral) to the stainless steel Numerous experiments have been carried out on billets in which ammonium chloride by itself was used as the additive. In some cases heating has been terminated in the third temperature phase first at 1000° C. and then at 1200° C. Examination has yielded variable results. The billets have shown mild to marked greenish oxide formation (indicating chrome oxides) on the inner walls of the stainless steel pipe. Such chrome oxides would undoubtedly hinder bonding during subsequent rolling.

The step of providing a reducing agent comprising solid ammonium chloride or urea in the billet is the subject of the invention defined in international patent application #PCT/GB94/00091.

SUMMARY OF THE PRESENT INVENTION

In one aspect of the invention, there is provided a method of producing a corrosion resistant ferrous product in which a billet which comprises a mass of particulate material composed substantially of engineering steel in a stainless steel jacket is heated to a temperature at which the billet can be plastically worked, the method being characterised in that it includes the step of providing in the jacket a first reducing agent in the form of a metal having a greater affinity for oxygen than chrome and a second reducing agent which is present in gaseous or vapour form in the jacket at a temperature substantially below 800° C.

In another aspect of the invention, there is provided a method of producing a corrosion resistant ferrous product in which a billet which comprises a mass of particulate material composed substantially of engineering steel in a stainless steel jacket is heated to a temperature at which the billet can be plastically worked, the method being characterised in that it includes the step of providing in the jacket a first reducing agent selected from the group comprising aluminium, titanium, zirconium, magnesium and sodium and a second reducing agent which is present in gaseous or vapour form in the jacket at a temperature substantially below 800° C.

Advantageously, the second reducing agent is present at a temperature substantially below 500° C.

In one form of the invention the second reducing agent is provided by a substance selected from the group comprising ammonium chloride, urea, iron bromide and ferric chloride. Advantageously, the substance is ammonium chloride.

In an alternative form of the invention, the second reducing agent is derived from a reducing furnace in which the billet is heated.

According to one aspect of the invention, the first reducing agent is in powder form. Advantageously, according to the invention, the first reducing agent is aluminium. Aluminium powder is readily commercially available and inexpensive.

In an alternative form of the invention, the first reducing agent is titanium. Advantageously the titanium is in the form of swarf. According to another aspect of the invention the particulate material is in the form of swarf composed substantially of engineering steel.

Even though aluminium oxidises and results in alumina inclusions in the product, it has been found that the use of this additive results in a higher yield strength steel. No more than 0.06% Al by weight of mild steel swarf is required to add strength.

The first reducing agent and, if it is used, the substance which forms the second reducing agent are advantageously mixed with the swarf before it is compacted in the jacket. The scope of the invention extends to billets produced by the process of the invention and products produced from such billets.

Experiment 1

A billet was prepared using mild steel swarf to which was added aluminium powder of 35 mesh size. The amount of powder added was 0.1% of the swarf by weight. The powder was mixed evenly throughout the swarf prior to compression of the swarf in a stainless steel pipe according to the techniques described in PCT/GB94/00091 and the other relevant patent applications discussed therein. The ends of the pipe were closed by welded on end plates. However vent holes were left in the end plates to allow the escape of gases from the interior of the billet when it was heated. The billet was heated to normal rolling temperature of 1250° C. in a conventional billet heating furnace. The vent holes were sealed immediately after removal from the furnace. Sealing was effected by welding the vent holes closed. When the billet had cooled, examination of the inside wall surface of the stainless steel pipe revealed some green oxide throughout the inner face of the stainless steel pipe indicating that mild oxidation had occurred.

The conclusion was that aluminium powder added in these conditions and in these quantities was insufficient or in some other way ineffective. Although even at low temperatures, aluminium has a greater affinity for oxygen than chrome, it is likely that the aluminium mixed in the swarf in this way is not sufficiently dispersed to be able to prevent oxidation of the chrome by residual oxygen and by $CO_2$ in the billet derived from decarburisation of the steel and the reduction of iron oxides initially present thereon. Should aluminium be added in greater quantities it is thought that an unacceptably high level of inclusions would result in the finished product.

Experiment 2

A billet was prepared using mild steel swarf to which was added a mixture comprising 0.1% by weight of $NH_4Cl$ powder and 0.1% by weight of aluminium powder (again of 35 mesh size). The additives were thoroughly mixed together and evenly distributed throughout the swarf. The billet was then heated as in experiment 1. A characteristic red/yellow flame from the ammonium chloride was observed in the furnace for the initial 30–40% of the time taken for the billet to reach a temperature of 1250° C. in the furnace. Inspection of the billet after sealing and cooling as in experiment 1 exhibited an almost completely reduced inner silver stainless steel pipe surface with substantially no trace of green oxides except over a short distance from each end. In these areas the stainless steel was very slightly discoloured, indicating that a small amount of oxidation had taken place on extraction from the furnace and before sealing of the billet ends.

Experiment 3

In order to try to avoid the discolouration which occurred in experiment 2, an attempt was made to eliminate the possibility of oxidising gases being sucked into the billet as a result of rapid cooling upon removal from the furnace with consequent reduction of volume of the internal gases. Two billets were prepared by the steps described in experiment 2 except that, three minutes before extracting the billet from the furnace, in a step believed to be inventive, tablets comprising compressed ammonium chloride powder by itself were added to each end of one of the billets before scaling. In the case of a second billet, the tablets comprised a mixture of equal parts of compressed ammonium chloride powder and aluminium powder were added. In both cases, vigorous burning of the tablets was observed on extraction of the billets from the furnace and continued until the vent holes were sealed. The flames emerging from the vent holes were bright white indicating a temperature in the region of 3000° C. After the billets had cooled they cut open. Inspection revealed no green oxides on the stainless steel at each end of the cool billets. It appeared therefore that the techniques worked satisfactorily to prevent oxidation of the stainless steel pipe. These techniques combined the effect of oxide reduction in the swarf and the prevention of extraneous oxidising gases from entering the billets. Oxide reduction was achieved by the additives in the swarf. The generation of reducing gases at each end of the billets prevented oxygen (i.e. air) from being sucked into the billets on sudden cooling when the billets were removed from the furnace.

The same experiment, adding pellets comprising aluminium powder alone to the end of a billet, yielded similar results.

Several billets have been prepared for rolling by the techniques set out in experiment 3 and hot rolled into finished products directly after removal from the furnace. In most of billets no mild steel end pieces have been used.

In laboratory conditions, no significant spreading of the cladding in relation to the core nor any significant elongation of the core out of the cladding has been observed. Substantially complete bonding of the cladding and the core in the finished product has been observed.

It is concluded that, by employing the techniques described, no end plugs are required to keep the core in and the oxidising gases out when the billet is removed from the furnace and subsequently hot rolled. Thus the use of mild steel end pieces will not necessarily be essential if the techniques described herein for preventing or reducing the formation of chrome oxides are employed.

Further benefits result from crimping the ends of the billet closed as described in patent application #PCT/GB90/01437. A few minutes prior to removal from the furnace, ammonium chloride and/or aluminium powder, compressed together into large pellets are placed into the two crimped ends. The crimped ends act conveniently as receptacles for the Al/$NH_4Cl$ pellets both in solid as well as in melted form. Al/$NH_4Cl$ added in this way acts as an oxygen trap or scavenger at the most vulnerable places in the billet which are the open ends.

There is no quantity limitation on the Al/$NH_4Cl$ added imposed by concerns for limiting resulting inclusions in the product in this case, because the two ends are always cropped and discarded during the hot rolling process. The aluminium, because it is effective for a longer time than the ammonium chloride, can be added at any stage and in fact could be added regularly throughout the billet heating phases prior to rolling. In fact, aluminium discs may be placed into the two ends of the billet before they are crimped so that the discs act initially to physically restrict the entry of gases into the billet. As the temperature rises, the discs act as reducing agents/oxygen traps and, above 600° C., they melt. The molten aluminium is contained in the crimped end portions of the billet which act as receptacles for the aluminium and as efficient oxygen traps as described above. The combined reactions are thought to be as follows:

In the first heating phase (up to 500° C.), the predominant reaction is the dissociation of the ammonium chloride when reducing/scouring gases are generated and in part remain present after the reaction is spent.

Even though the aluminium powder is undoubtedly complementing the reducing reaction during this phase, it is thought that it is most effective during the subsequent phases. In the second phase (500–800° C.) the aluminium is in its greatest reducing mode. It melts at 600° C. thereby suddenly increasing its reactive surface area. In this temperature range, aluminium is an extremely efficient reducing agent as its affinity for oxygen/oxide is greater than that of chrome. Hence, oxidation of the aluminium takes place in preference to oxidation of the chrome in the stainless steel. It is thought that in this phase, when the Boudouard equilibrium would be at its most damaging to chrome, oxidation is either largely suppressed or swings completely towards the carbon monoxide/carbon side of the equation, because any free oxygen/carbon dioxide, and in fact substantially any gases except for the highly reducing gases still present from the first phase are removed from the system by the aluminium.

The next phase (800–1250° C.) is probably a continuation of the previous phase, except that the aluminium produces an even stronger reducing reaction with less gaseous phases present. The Boudouard equation strongly favours a carbon monoxide atmosphere above 800° C. with the aluminium tending to reduce the carbon monoxide back to carbon in the mild steel. Any oxidising effects on the stainless steel, arising from the Boudouard equation, are largely neutralised. Any carbon monoxide present in the system may act as a reducing gaseous medium with chrome in the presence of aluminium at these temperatures. Oxides present on the steel particles in the core are probably reduced either in the solid phase in proximity with the aluminium powder which is finely dispersed throughout the billet or in the gaseous phase by transient carbon monoxide.

In the final stage the billet is removed from the furnace. In this stage the oxygen scavenging effect of the aluminium combined with the generation of reducing gases from any ammonium chloride added help to ensure that if there is sudden cooling when the billet is removed from the furnace, any gases sucked into the billet are reduced before they are able to oxidise the chrome.

The amount of $Al/NH_4Cl$ pellets needed can be visibly determined. If no flames are observed, more pellets could be added prior to removal of the billet from the furnace. Again, no problems arise from the use of too many pellets at the two ends of the billet as these ends are discarded during rolling.

It is thought that graphite would also act to prevent or reduce oxidation in the billets prepared according to the techniques of the invention. Accordingly, powdered graphite may be mixed with the aluminium powder and the ammonium chloride and/or urea if the latter are used. In most cases however, the carbon which diffuses out of the mild steel swarf making up the core when the billet is heated should provide a sufficient source of carbon for this purpose. Engineering steel of up to about 0.45% carbon content should in most cases be suitable for producing products according to the techniques of the present invention.

BRIEF DESCRIPTION OF THE DRAWINGS

Further aspects of the invention will appear from the following description of examples of the invention with reference to the accompanying drawings in which FIG. 1 is a block diagram showing in schematic form successive stages in a process for producing finished products using scrap steel swarf;

FIG. 2 is a schematic cross sectional view of a billet comprising a core of mild steel jacketed in a stainless steel tube;

FIG. 3 is a schematic sectional detail of one end of the billet;

FIG. 4 is a schematic sectional detail of a flat bar rolled from the billet;

DETAILED DESCRIPTION OF EMBODIMENTS OF THE INVENTION

Figure 7:
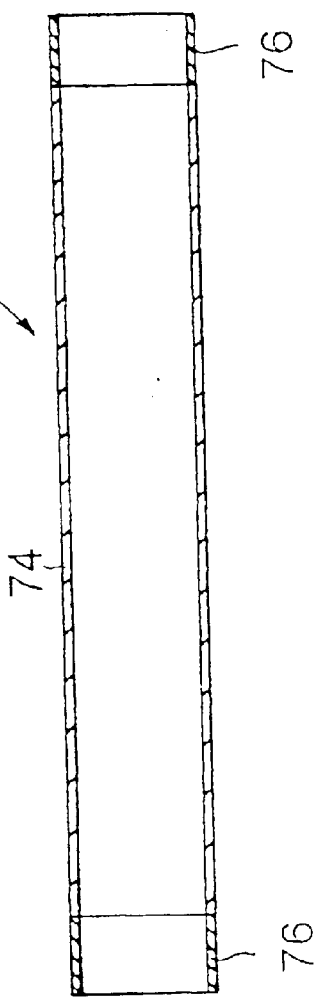
FIG. 7 is a schematic view, similar to FIG. 2, of a first modified billet.

To prepare the billet shown in FIG. 2, swarf in the form of shavings composed of mild steel or other suitable grade of engineering steel envisaged above is used. The swarf is first passed through a primary crushing apparatus 8 such as a hammer mill or other crusher of conventional kind. In the apparatus 8, the swarf undergoes a first size reduction to make it less bushy and easier to handle. However, it cannot at this stage be reduced to chips of too small a size because, as long as they are oily and dirty, the chips have a strong tendency to clog the apertures of the crusher.

From the crusher 8 the chips are then fed by a conveyor to a cleaning and degreasing apparatus 10 of conventional kind in which oil, water and other impurities are removed from the chips. In order to remove the impurities it may be necessary for the apparatus 10 to include a rotary kiln through which the shavings are passed in order to burn the oil and other impurities off.

After passing through the apparatus 10 the shavings are taken to a second or final crusher 20 (again a hammer mill or other crusher of conventional type) where they are crushed into smaller chips. It is advantageous to reduce the size of the chips in order to increase the surface area to weight ratio thereof so that reduction of surface oxides by decarburisation at a later stage in the process can take place as rapidly as possible. However the chip size is not critical and could be between say, 2 and 10 mm. In the final crushing operation, dust and surface oxides separate from the swarf.

After passing through the final crusher, the chips will usually be briquetted as described below. However, they may optionally first be passed through a heating and annealing apparatus 30 where they are heated in a reducing atmosphere to a temperature of between 950° and 1200° C. In the apparatus 30, surface oxides on the chips are reduced. The apparatus 30 may be a second rotary kiln into which, as will be well understood, the chips are fed continuously at one end. The chips progress through the kiln by gravity. After reduction of the surface oxides, the chips are annealed by being allowed to cool slowly in a cooling furnace 32 in which an inert or reducing atmosphere (eg of methane) is maintained so that there is minimal chance of re-oxidation of the chips occurring. The cooling furnace 32 may also be a rotary kiln. Where rotary kilns are used for the apparatus 30, 32 the chips may, after exiting from the kiln 30, be conveyed to the cooling kiln 32 by a screw conveyor 33 mounted in a closed housing to exclude the air. The chips are removed from the cooling kiln only after they have cooled to ambient temperature.

The above described method of and apparatus for producing chips from swarf are discussed in further detail in the applicants' international patent application #PCT/GB90/01113.

The chips are then compacted in a briquetting press 34 to form a jacketed billet. If the chips have been passed through the heating and annealing apparatus 30, the briquetting is carried out as soon as possible after they have been allowed to cool. Chips are softer when they have been annealed and a less powerful press is required for briquetting to the same degree of compaction.

A billet 40 is shown in FIG. 2. The billet comprises an outer jacket 42 in the form of a tube of grade ASTM A316L, or any other suitable grade of, stainless steel. In the present example the chips are compressed to form briquettes 46 by a single ram 48. A modified pressing apparatus which can be used to form the billets is disclosed in the specification of the applicants' international patent application # PCT/GB90/01438.

In any case, prior to the briquetting operation a predetermined quantity of powder comprising equal parts of powdered aluminium and ammonium chloride is mixed with the chips while they are still at ambient temperature. A quantity of powder equal to 0.1% by weight of the swarf is sufficient. Successive charges of this mixture of chips and additive are inserted in the jacket and compressed by the press to form a series of the briquettes. The briquettes substantially fill the jacket leaving a small gap at each end which is closed by a close fitting aluminium plate 50 pressed into place.

Figure 6:
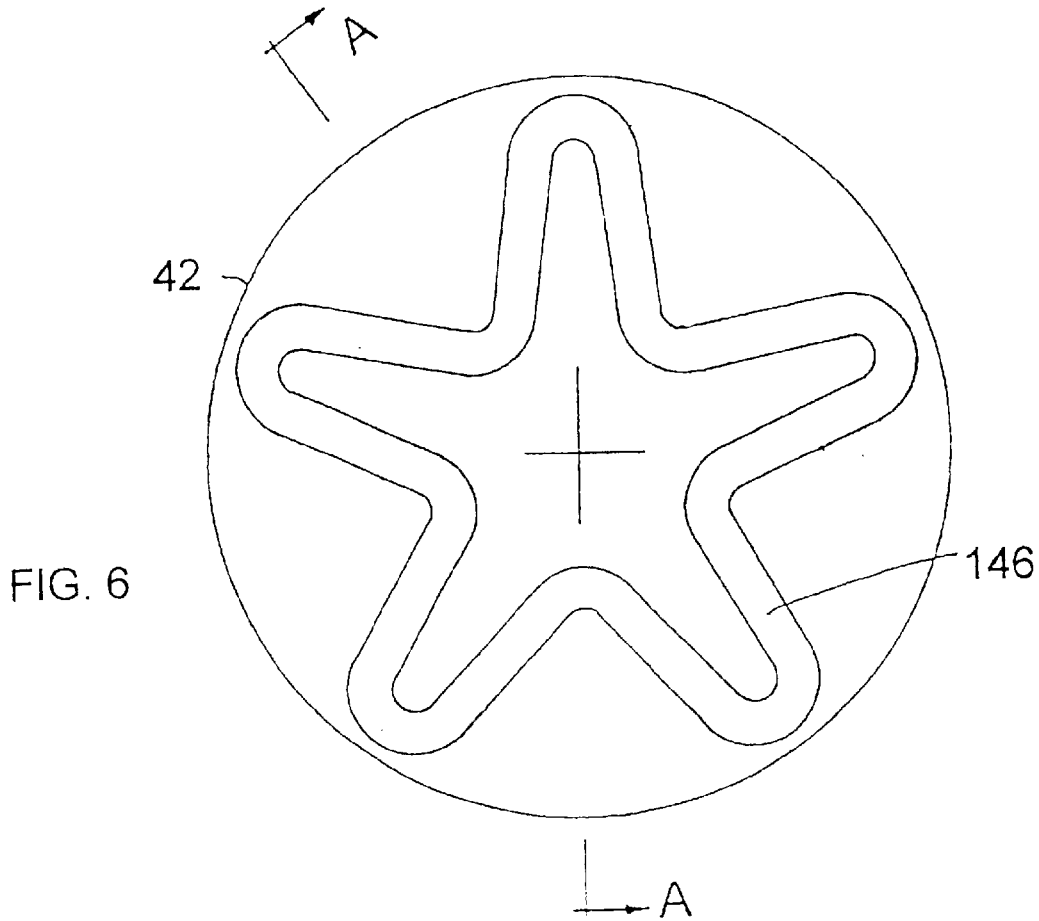
FIG. 6 is an end view of the billet after crimping.
Figure 5:
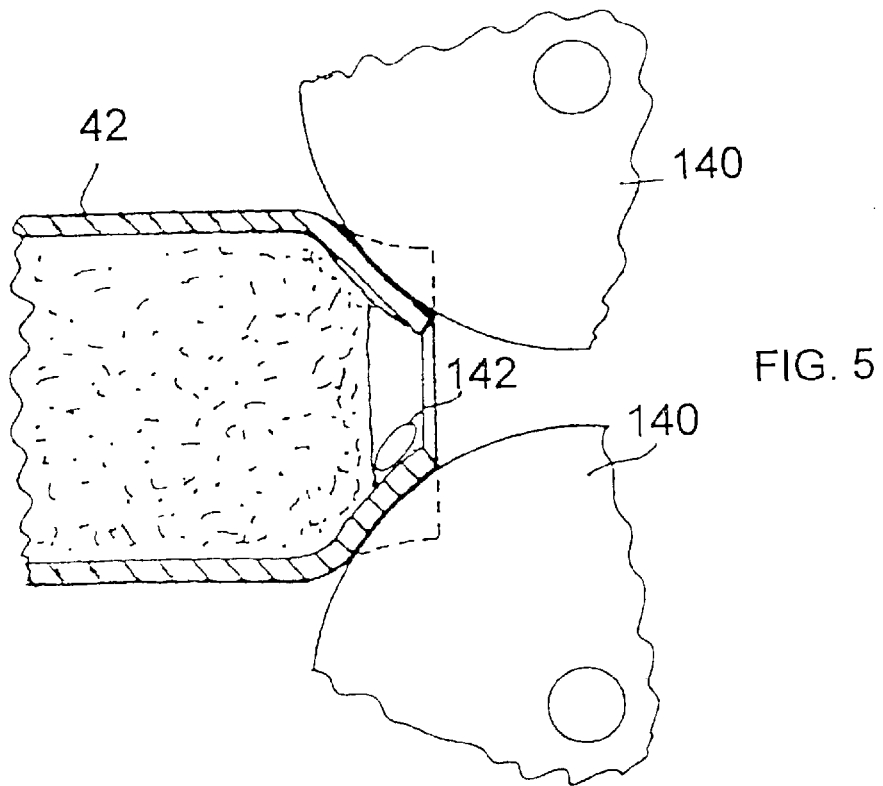
FIG. 5 is a somewhat schematic section view on A—A in FIG. 6.

The ends of the billet are now crimped closed and shaped as described more fully in the applicants' international patent application # PCT/GB90/01437. In this process the ends of the billet are forced between a set of five tapered discs 140 mounted on a suitable support and arrayed so that they lie in planes which are equally angularly disposed about a common centre line at which the planes intersect. The discs crimp the ends of the billet into the shape of a five pointed star 146 as shown in FIG. 6. The billet is then heated in a conventional billet heating furnace 35 to about 1250° C. It is not necessary to maintain reducing conditions in the furnace. A reducing furnace could be used but such furnaces are expensive to construct and to operate.

About three minutes before the billet is removed from the furnace, pellets 142 comprising equal parts of aluminium powder and $NH_4Cl$ are placed in the crimped ends of the billet as described above. The billet is removed from the furnace and immediately rolled, using conventional techniques, in a rolling mill 36 substantially as described in British patent #1313545.

Numerous billets formed by the process described above and examined after being allowed to cool have consistently been substantially free of the aforementioned green oxide layers occurring on the inner face of the stainless steel jacket and at the interface between the jacket and the core. Similar results have been experienced when the same pellets were used in billets from which the aluminium plates 50 were omitted. However, it is believed that the provision of the plates is inventive in that the plates help to "grab" the oxygen from any air which is sucked into the billet as it cools.

Figure 4A:
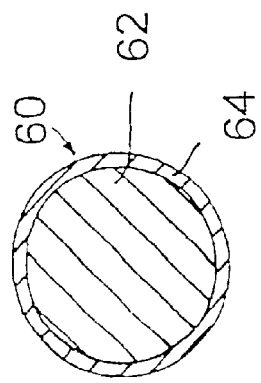
FIG. 4a is a schematic sectional detail of a round reinforcing bar rolled from the billet.

Products (such as flat bars, angle bars and reinforcing bars) rolled from such billets have consistently exhibited substantially complete bonding between the mild steel core and the stainless steel cladding. A topical flat bar rolled from a billet is shown at 54 in FIG. 4. The flat bar comprises a core 56 of mild steel which is cladded with a stainless steel cladding 58 of substantial thickness. A typical round reinforcing bar rolled from a billet is shown at 60 in FIG. 4a and comprises a core 62 of mild steel cladded with a stainless steel cladding 64. Such products have been rolled from a billet comprising a core of compressed swarf briquettes in a stainless steel pipe of 10 cm diameter.

By way of example only, typical sizes of products (with their stainless steel cladding thickness given in brackets) rolled from such billets include:

38×13 mm flat bar (1.0 mm)

25×13 mm flat bar (0.9 mm)

19×10 mm flat bar (0.8 mm)

16 mm diameter rebar (0.9 mm)

20 mm diameter rebar (1.2 mm)

25 mm diameter rebar (1.4 mm)

32 mm diameter rebar (1.8 mm)

Cladding thickness can be altered by selecting the wall thickness of the stainless steel pipe.

After the product is rolled the end portions are cut off and discarded.

The amount of aluminium and/or $NH_4Cl$ which needs to be added depends on the quantities of materials making up the billet. Billets made with swarf prepared as described above can have as little as 10% air space after compaction. A quantity of powder comprising equal parts of both Al and $NH_4Cl$ and equal to 0.06–0.1% by weight of the mild steel swarf should normally be adequate.

Aluminium powder of 99.7% purity, air atomised and irregular should be suitable for most purposes. Suitable particle size of the powder is −45±5 $\mu$m.

Independent metallurgical test have been carried out on a sample of 100 randomly selected high tensile ribbed rebars of 16 mm diameter with a core formed from compressed carbon steel swarf as disclosed above and a cladding of ASTM A316L stainless steel, 0.9 mm thick.

The chemical composition (in % by weight) of the core was found to be as follows:

| C | Mn | P | S | Si | Cu | Cr | Ni | Mo | Al | Nb + V |
|---|---|---|---|---|---|---|---|---|---|---|
| 0.35 | 1.03 | 0.017 | 0.044 | 0.25 | 0.10 | 0.15 | 0.16 | 0.04 | 0.028 | <0.005 |

Tensile and bend tests were carried out to British Standard BS 4449—Hot Rolled Steel Bars for the Reinforcement of Concrete. The results of the tests show that most of the bars were rolled at about 900° C. and above judged by the average measured temperature of around 840° C. at which the rebars arrived at the cooling bed. Some of the arrival temperatures recorded were however as low as 700° C. and would have been rejected if destined for commercial use. In the present instance they were included in the analysis. The tensile tests resulted in the following averages:

|  | 0.2% Proof Stress (Mpa) | Ultimate Tensile Stress (Mpa) | Elongation (%) |
|---|---|---|---|
|  | 497 | 736 | 15.5 |
| Standard Deviation | 20.6 | 44.9 | 30 |
| 95% Confidence Limit | 4.0 | 8.8 | 0.6 |

The results of the 0.2% Proof Stress and Ultimate Tensile Stress are well above what the specifications require.

In the bend tests, there were no failures on bars which were rolled at above 800° C. There was close correlation between samples from bars with finishing temperatures below 800° C. (as noted above) and 5 of the samples which had lower elongations which also resulted in bend test failures.

In fatigue tests carried out on similar bars, 1 sample completed 4 million cycles and 2 samples completed 2 million cycles, both without failure or debonding of the cladding from the core.

As noted, the thickness of the stainless steel pipe of the billet before rolling is 6 mm and the pipe represents 21.6% by weight of the billet. This weight ratio is maintained throughout the rolling process resulting in progressively thinner cladding.

Although in the process described with reference to the drawings, the jacket of the billet comprises a stainless steel pipe without mild steel end pieces welded thereto, this possibility is not excluded. In fact, as noted above, use of such end pieces has advantages including a cost advantage. The raw material cost of the mild steel end pieces is substantially less than that of the equivalent length of stainless steel pipe so that the overall cost of a billet with the mild steel end pieces is likely to be cheaper than one without them, despite the additional cost of producing the mild steel end pieces and welding them to the centre section. Such a billet 70 is shown in FIG. 7. The billet comprises a core 72 of mild steel briquettes compressed into a stainless steel pipe 74. Short lengths of pipe 76 composed of mild steel are welded to each end of the pipe 74. Aluminium discs 78 similar to the discs 50 shown in FIG. 3, are placed in the ends of the pipe which are then crimped closed as disclosed above.

The billet 70 is prepared and rolled according to the techniques described above and in patent application #PCT/GB90/01437.

Billets prepared and tested as in experiment 2 described above but using titanium turnings instead of aluminium powder yield similar results. The same is true of zirconium. Titanium melts only at about 1800° C. and zirconium at 1857° C. Above 900° C. oxygen dissolves into titanium rather than just forming an oxide layer on the surfaces of the titanium particles as in the case of aluminium. So the capacity of titanium to absorb and/or reduce oxygen is not limited to its surface area. However, both titanium and zirconium are much more expensive than aluminium and not readily available.

Although the use of the both titanium and zirconium in preference to aluminium is not discounted, it is thus thought that neither of these alternative additives is likely to be a commercially viable alternative to aluminium except perhaps for products with special requirements.

Figure 8:
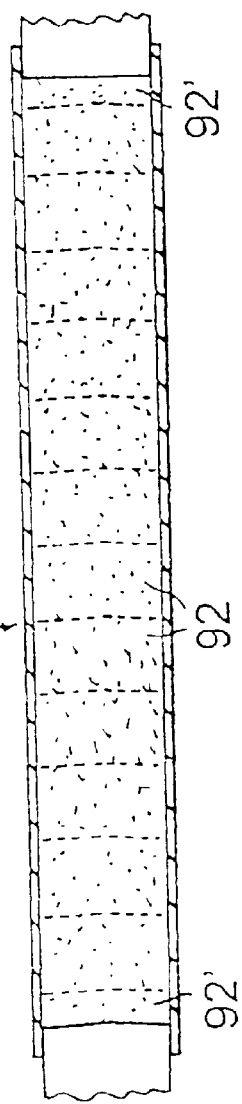
FIG. 8 is a schematic view, similar to FIG. 2, of a second modified billet.

Titanium and/or zirconium turnings or powder may usefully be mixed in the swarf making up the two briquettes inserted one at each end of a billet. This is illustrated schematically in FIG. 8. This shows a billet 90 having a core of briquettes 92 compressed into a stainless steel pipe 94. All of the briquettes are formed from swarf of engineering grade steel which as been cleaned and treated as described above with reference to FIG. 1. 1% by weight of powdered aluminium was mixed with the swarf making up all briquettes in the billet except the briquettes 92' at each end of the billet. The end briquettes 92' are composed of swarf with which is mixed titanium (zirconium could also be used) turnings. Short lengths of pipe 96 composed of mild steel may optionally be welded to each end of the pipe 94. In the present case the aluminium discs 50, 78, shown in FIGS. 3 and 7 are omitted. The ends of the pipe 94 which are crimped closed as disclosed above.

1% by weight of titanium turnings in briquettes 92' weighing ½ kg for insertion in a 10 cm diameter pipe for a billet 1 metre long is sufficient. Because the titanium in such briquettes will not have melted when the billet reaches rolling temperature (1250° C.) the titanium is likely to be more effective than aluminium in stopping oxygen from entering the billet upon removal from the furnace and during rolling. The temperature of the product when rolling is complete is typically 900° C. Aluminium melts at 600° C. and is likely to have gravitated to the bottom of the billet before the billet is removed from the furnace.

Other metals which might in certain circumstances find use as alternatives to or in combination with, aluminium include sodium and magnesium. However, both are probably too dangerous to use unless special safety precautions are taken to prevent ignition even at room temperature.

Billets prepared and tested as in experiment 2 but using powdered urea instead $NH_4Cl$ yield similar, though somewhat more variable, results. Urea is a viable commercial alternative to ammonium chloride when used in the techniques of the present invention. Other substances which might find use as alternatives to, or in combination with, ammonium chloride or urea include:

ammonium nitrate—decomposes at 210° C. However, this substance has explosive properties, produces toxic fumes and enhances the combustibility of other substances. It is likely to be unsafe at high pressures.

ammonium tri-iodide—decomposes at 175° C. However, its molecular weight is 400 and the amounts required will be relatively large. It is expensive.

iron bromide—evaporates at 27° C. and then decomposes. It is believed that its action is similar to that of ammonium chloride for which it may thus be suitable as a substitute. However, it is more expensive.

ferric chloride—in its anhydrous form boils at 332° C. It is believed that its action is similar to that of ammonium chloride. It does not decompose. Mixing ferric chloride with the swarf may be inconvenient due to its very hygroscopic nature. However, it should be possible to achieve correct dosing by treating a small quantity of fine chips with concentrated hydrochloric acid, making ferric chloride. This would be added immediately to the chips which are about to be compressed into briquettes. If the atmosphere in the press and the hopper from which the press is charged is kept dry and inert the resulting anhydrous ferric chloride should pick up very little moisture during the billet forming process.

Various organic compounds which are either reducing or inert might also be useful as alternatives to, or in combination with, ammonium chloride or urea. These include in particular the following:

benzylamine—is a liquid, boiling at 184° C. and having a molecular weight of 108.

octadecylamine—is a filming amine which could be mixed with the swarf chips as an inerting agent.

benzyl bromide—is a liquid which boils at 199° C. It decomposes in a flame producing toxic fumes. Benzyl chloride is similarly hazardous.

urea hydrochloride—is a solid reducing agent which decomposes at 145° C. It has a molecular weight of 96.

zinc amide—is a reducing agent which decomposes at 200° C. in vacuum. Barium diamide melts at 280° C.

nitryl amide—an unstable weak acid which decomposes at 72° C.

Most of the above organic compounds break down at high temperatures. If insufficient oxygen is available they may form carbon. Because such carbon is widely dispersed, it is likely to have the same effect as the addition of graphite, noted above. Although the use of the organic compounds mentioned in preference to ammonium chloride or urea is not discounted, it appears at this stage that there will be little advantage in doing so. The furnace 35 may be a reducing furnace in which, as is well known, a reducing atmosphere such as is provided by methane is maintained throughout the billet heating cycle. The (reducing) furnace gas begins to displace the residual oxygen in the billet when the billet is still cool. Furthermore, any residual oxygen still present in the billet, and $CO_2$ or other oxidising gases evolved as a result of decarburisation of the chips as the billet heats up to 800° C., are reduced to CO by the furnace gas. The furnace gas thus functions to prevent the formation of chrome oxides in the same way as ammonium chloride, urea or the other powdered additives described above which provide the gaseous reducing agent in the billet up to 800° C. Under suitably controlled conditions, it may therefore be unnecessary to add these additives. However, it will still be necessary to mix the aluminium powder or one of the alternatives thereto with the swarf as discussed above to prevent oxidation of the chrome above 800° C.; and to add the pellets as discussed above to the billet ends before it is removed from the furnace.

Grades of stainless steel which have been used to form pipes for the billets include ASTM A316L, A304L and 409, and 3Cr12. There are undoubtedly other grades which may be suitable.

It is not intended that recognised mechanical equivalents of and/or modifications of and/or improvements to any matter described and/or illustrated herein should be excluded from the scope of a patent granted in pursuance of any application of which this specification forms a part or which claims the priority thereof or that the scope of any such patent should be limited by such matter further than is necessary to distinguish the invention claimed in such patent from the prior art.

What is claimed is:

1. A method of producing a corrosion resistant ferrous product in which a billet which comprises a mass of particulate material composed substantially of engineering steel in a stainless steel jacket is heated to a temperature at which the billet can be plastically worked, the method comprising the step of providing in the jacket a first reducing agent in the form of a metal having a greater affinity for oxygen than chrome and a second reducing agent which is present in gaseous or vapor form in the jacket at a temperature substantially below 800° C.

2. A method according to claim 1, wherein the first reducing agent is selected from the group consisting of aluminum, titanium, zirconium, magnesium and sodium.

3. A method according to claim 1, wherein the second reducing agent is present at a temperature substantially below 500° C.

4. A method according to claim 1, wherein the second reducing agent is provided by a substance selected from the group consisting of ammonium chloride, urea, iron bromide and ferric chloride.

5. A method according to claim 1, wherein the second reducing agent is derived from a reducing furnace in which the billet is heated.

6. A method of producing a corrosion resistant ferrous product in which a billet which comprises a mass of particulate material composed substantially of engineering steel in a stainless steel jacket is heated to a temperature at which the billet can be plastically worked, the method comprising the step of providing in the jacket a first reducing agent selected from the group consisting of aluminum, titanium and zirconium and a substance selected from the group consisting of ammonium chloride, urea, iron bromide and ferric chloride.

7. A method according to claim 6, wherein said substance is ammonium chloride.

8. A method according to claim 6, wherein said substance is urea.

9. A method according to claim 6, wherein the first reducing agent is aluminum.

10. A method according to claim 9, wherein the aluminum is in powder form.

11. A method according to claim 6, wherein the first reducing agent is titanium.

12. A method according to claim 11, wherein the titanium is in the form of swarf.

13. A method according to claim 6, wherein the particulate material is in the form of swarf.

14. A billet which comprises, in a stainless steel jacket, a mass of particulate material composed substantially of engineering steel, a first reducing agent in the form of a metal having a greater affinity for oxygen than chrome, and a second reducing agent in the form of a substance selected from the group consisting of ammonium chloride and urea.

15. A product comprising a core of engineering steel with a stainless steel cladding, wherein the product is produced by heating and plastically working a billet according to claim 14.

16. A billet according to claim 14, wherein the first reducing agent is selected from the group consisting of aluminum, titanium, zirconium, magnesium and sodium.

17. A billet according to claim 14, wherein the first reducing agent is aluminum.

* * * * *